United States Patent
Komiya (10) Patent No.: US 8,200,053 B2
(45) Date of Patent: Jun. 12, 2012

(54) OPTICAL SWITCH

(75) Inventor: Shinji Komiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 349 days.

(21) Appl. No.: 12/535,339

(22) Filed: Aug. 4, 2009

(65) Prior Publication Data

US 2010/0034498 A1 Feb. 11, 2010

(30) Foreign Application Priority Data

Aug. 8, 2008 (JP) ................................. 2008-205044

(51) Int. Cl.
G02B 6/26 (2006.01)
H04B 17/00 (2006.01)
G11B 20/10 (2006.01)

(52) U.S. Cl. ................ 385/18; 385/15; 385/46; 385/47; 385/24; 398/33; 398/79; 398/82; 369/47.2

(58) Field of Classification Search .................... 385/18, 385/40, 41, 42, 46, 47, 45, 50, 49, 14, 129, 385/130, 131, 132, 15, 16; 398/33, 79, 82, 398/83, 101; 369/47.2, 100, 102, 275.1, 369/13.24, 13.28
See application file for complete search history.

(56) References Cited

U.S. PATENT DOCUMENTS

| 5,894,362 A * | 4/1999 | Onaka et al. ..................... 398/95 |
| 6,269,204 B1* | 7/2001 | Ishikawa .......................... 385/24 |
| 6,275,623 B1* | 8/2001 | Brophy et al. .................. 385/14 |
| 7,471,899 B2* | 12/2008 | Kim et al. ........................ 398/69 |
| 7,521,660 B2* | 4/2009 | Takushima et al. ........ 250/214 R |
| 2005/0123300 A1* | 6/2005 | Kim et al. ........................ 398/84 |
| 2005/0238285 A1 | 10/2005 | Takushima et al. ............. 385/24 |
| 2006/0045520 A1* | 3/2006 | Nakano et al. .................. 398/33 |
| 2010/0034498 A1* | 2/2010 | Komiya .......................... 385/18 |

FOREIGN PATENT DOCUMENTS

JP 2005-301123 10/2005

* cited by examiner

*Primary Examiner* — Brian Healy
(74) *Attorney, Agent, or Firm* — Staas & Halsey LLP

(57) ABSTRACT

An optical apparatus including input ports receiving WDM light, an output port, a first wavelength dividing unit that divides the lights input from the input ports into divided lights with different wavelengths, an optical signal processing unit that reflects the divided lights respectively to the first wavelength dividing unit, thereby light from one of the input ports is directed to the output port, for respective wavelength of the divided lights, a light source outputting a monitor light, a first coupler branching the monitor light to the monitor lights to the input ports, a second coupler branching the monitor lights output from the output port and outputs branched output monitor light, a second wavelength dividing unit that divides the branched monitoring lights into divided lights with different wavelengths, and a monitoring unit monitoring the divided lights from the second wavelength dividing unit.

14 Claims, 12 Drawing Sheets

OPTICAL SWITCH

CROSS-REFERENCE TO RELATED APPLICATIONS

This application is based upon and claims the benefit of priority of the prior Japanese Patent Application No. 2008-205044, filed on Aug. 8, 2008, the entire contents of which are incorporated herein by reference.

BACKGROUND

1. Field

The present invention relates to a wavelength selective optical switch which may be applied to a wavelength selective optical switch using MEMS (Micro Electro Mechanical Systems) mirrors.

2. Description of the Related Art

In a Wavelength Division Multiplexing ("WDM") optical communication system, an optical switch that performs a wavelength selection is used to switch optical paths.

As one mode of such an optical switch (wavelength selective optical switch) that performs an optical signal selection based on a wavelength, a configuration applying MEMS (Micro Electro Mechanical Systems) technology using mirrors is known.

Figure 1A:
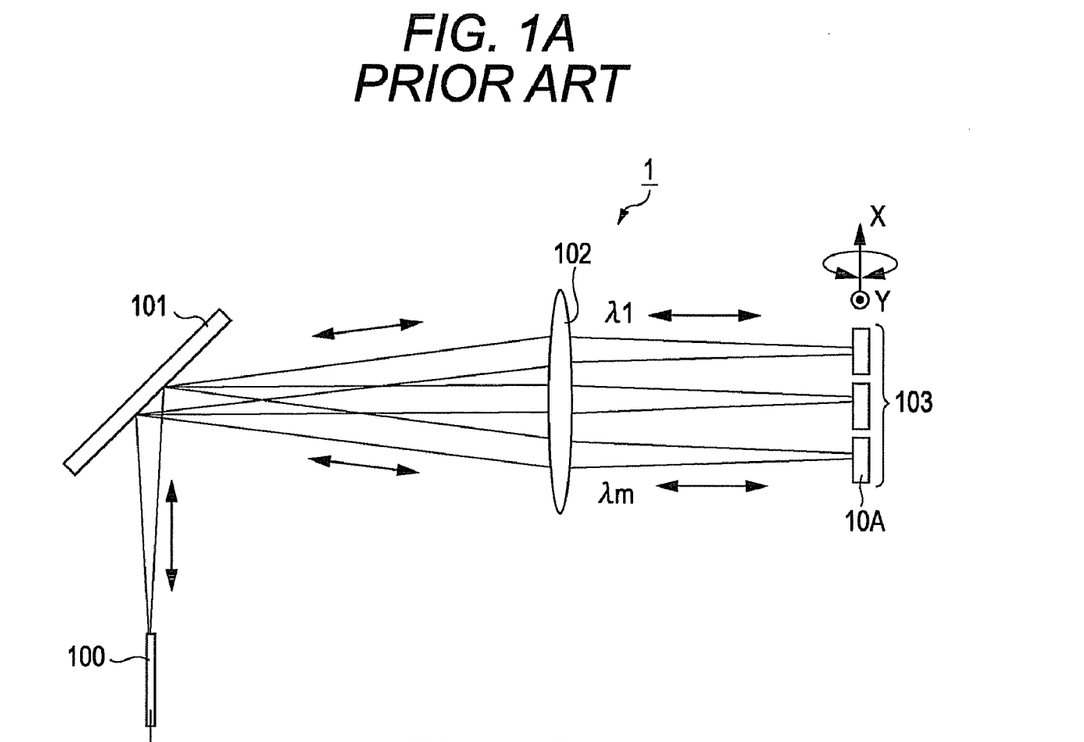
FIGS. 1A and 1B are diagrams illustrating a wavelength selective optical switch according to a typical system.
Figure 1B:
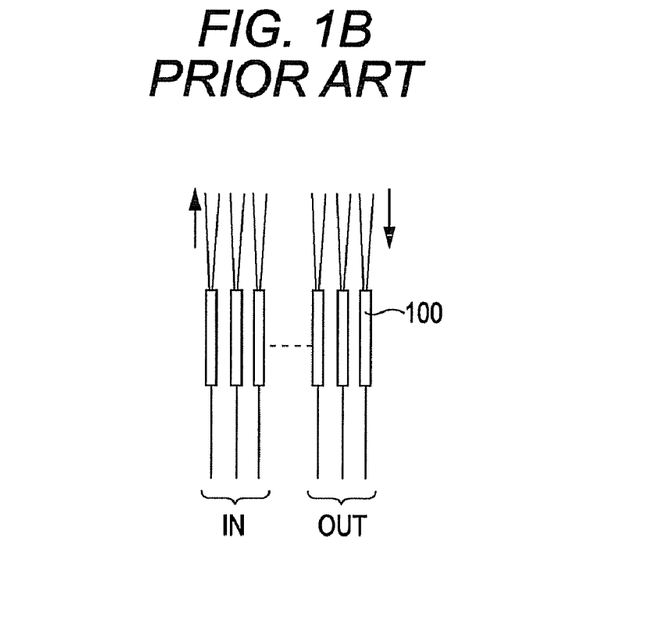

FIGS. 1A and 1B are respectively a top view and a side view of a typical wavelength selective optical switch 1. The wavelength selective switch 1 has a first optical element 100, a wavelength dividing unit 101, a second optical element 102, and an optical signal processing unit 103.

As illustrated in FIG. 1B, the first optical element 100 has an optical fiber having a plurality of input ports IN and a plurality of output ports OUT, and a collimating lens (not shown).

The wavelength dividing unit 101 is, for instance, a diffraction grating that divides WDM signal lights (wavelengths $\lambda 1$ to $\lambda m$) entering from the input ports IN of the first optical element 100, into optical signals of m different wavelengths.

As illustrated in FIG. 1A, the second optical element 102 inputs the divided lights from the wavelength dividing unit 101 and guides the lights to the optical signal processing unit 103.

The optical signal processing unit 103 is, for instance, folding type mirrors of an MEMS array 10A, which includes m MEMS mirrors 10 arranged in an array.

Figure 2:
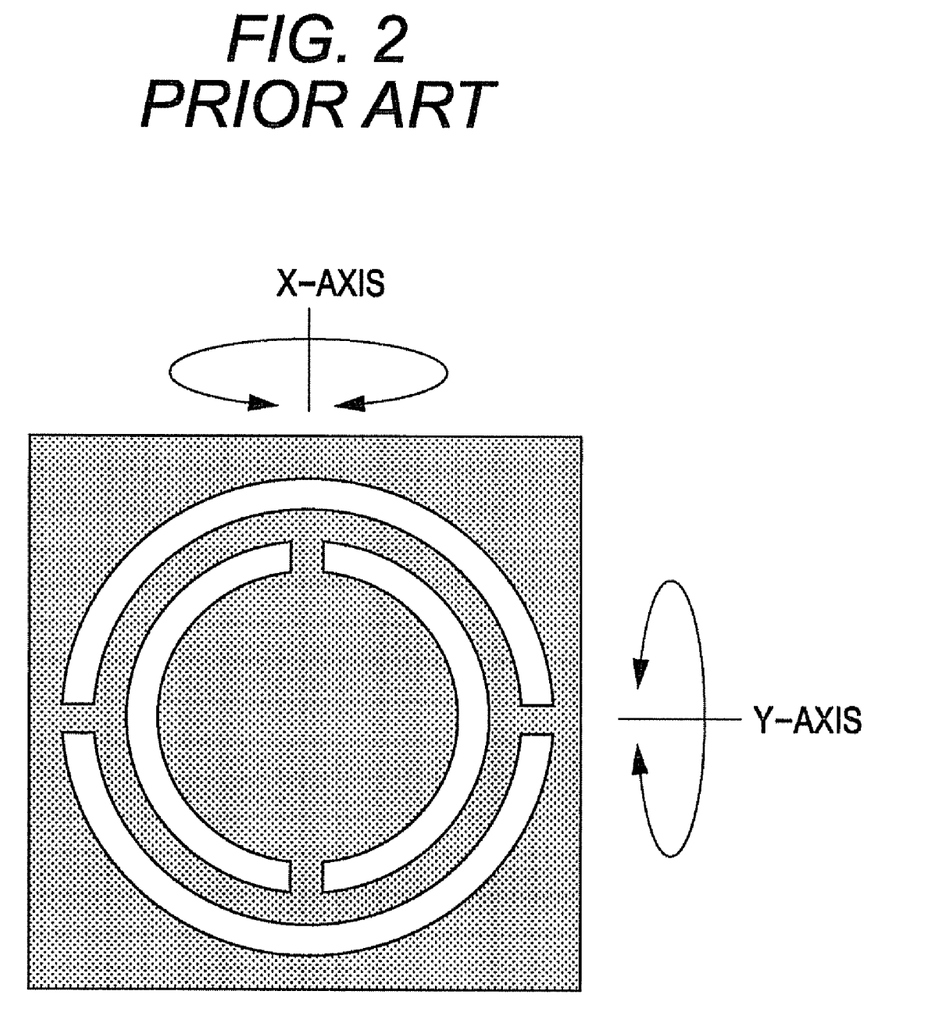
FIG. 2 is a diagram illustrating one of MEMS mirrors composing a MEMS array according to a typical system.

FIG. 2 is a diagram illustrating one of the MEMS mirrors 10 in the MEMS array 10A. The MEMS mirror 10 is driven to change its angle around an X-axis and a Y-axis, by which the MEMS mirror 10 is supported. For example, the MEMS mirror 10 can be driven to change its angle around the X-axis and the Y-axis, by generating electrostatic attractive force by a voltage applied to an electrode which is disposed on the rear side of the MEMS mirror 10.

In the configuration illustrated in FIG. 1A, by changing the angle of one of the MEMS mirrors 10A, selects a direction of the folding mirror in which divided lights entering the MEMS mirror from the wavelength dividing unit 101 are to be sent, and further selects an output port to which reflected lights returning from the folding mirror are to be output.

As described above, in the MEMS array 10A of the optical signal processing unit 103, by changing the angles around the X-axis of the MEMS mirrors 10 disposed in an array, reflected lights with corresponding wavelengths can be coupled from an arbitrary input port IN to an arbitrary output port OUT.

Here, when there are only one input port IN and there are plurality of output ports OUT, the switch operates as a DROP-type wavelength selective optical switch that couples signal lights with an arbitrary wavelength from the one input port IN to an arbitrary output port OUT.

On the contrary, when there is a plurality of input ports IN and one output port OUT, the switch operates as an ADD-type wavelength selective optical switch that couples signal lights with an arbitrary wavelength from an arbitrary input port IN to the one output port OUT.

At this time, such setting can be performed that by further slightly rotating a MEMS mirror around the X-axis or the Y-axis, signal lights with an arbitrary attenuation are coupled from the input port IN to an arbitrary output port OUT.

That is, lights reflected from the optical signal processing unit 103 are collimated by the second optical element 102 and the collimated reflected lights with all wavelengths follow the same path via the wavelength dividing unit 101. Then, the lights are guided to the output ports OUT of the first optical element 100. At that time, the reflected lights are controlled on a wavelength-by-wavelength basis by controlling the angles around the X-axis or the Y-axis of the MEMS mirrors 10 of the optical signal processing unit 103, and are coupled to a fiber end of an arbitrary output port OUT, with attenuations given by the angles around the X-axis or the Y-axis of the MEMS mirrors 10.

At this time, when, for example, there are only one input port and one output port, only attenuations for respective wavelengths are set by the angles around the X-axis or the Y-axis of the MEMS mirrors 10 of the MEMS array 10A.

Figure 3:
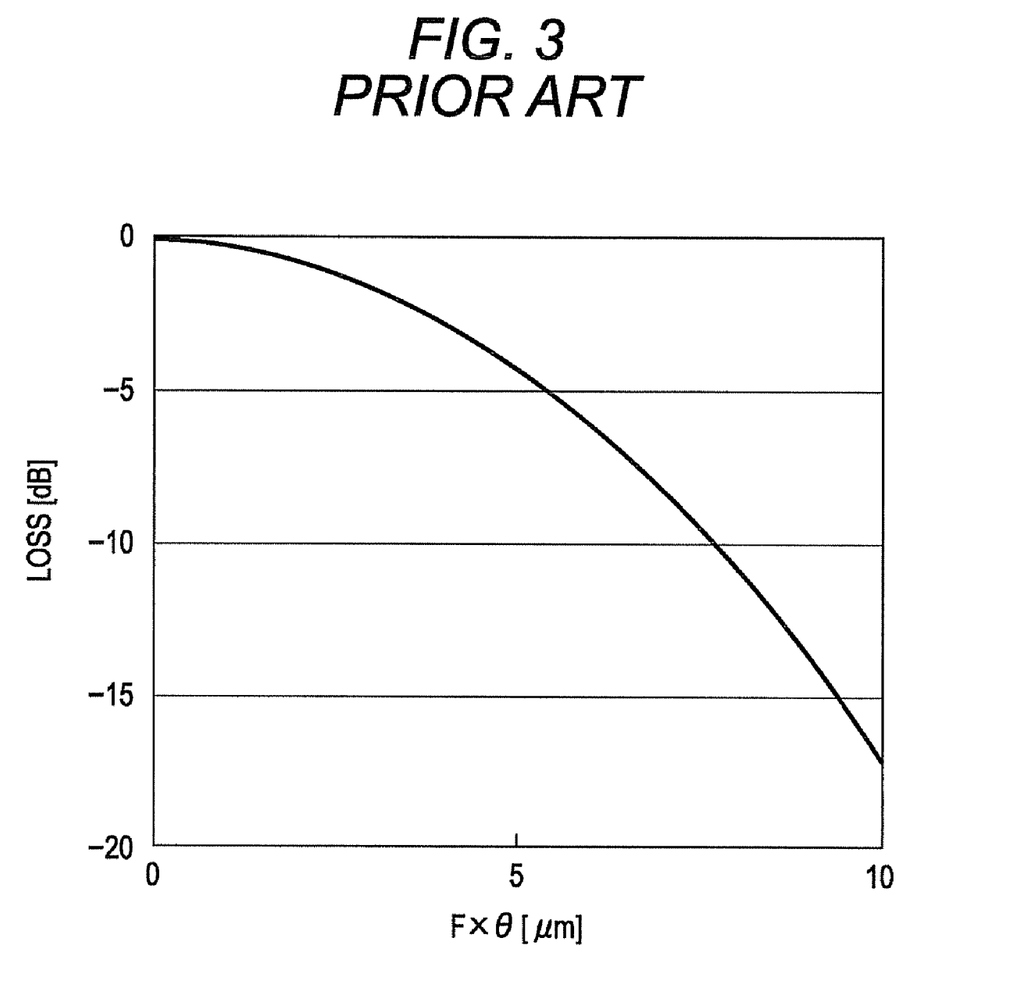
FIG. 3 is a graph illustrating attenuation relative to an angle of a MEMS mirror.

FIG. 3 is a graph illustrating attenuation relative to an angle of a MEMS mirror 10 (FIG. 1A). A third optical element is an optical element (not illustrated) between the MEMS mirror 10 in the optical signal processing unit 103 and the second optical element 102. The graph illustrates, as an example, the attenuation relative to $F\times\theta$, where F is a focal length of a third optical element and $\theta$ is an angle of the MEMS mirror 10 and the third optical element.

Figure 4:
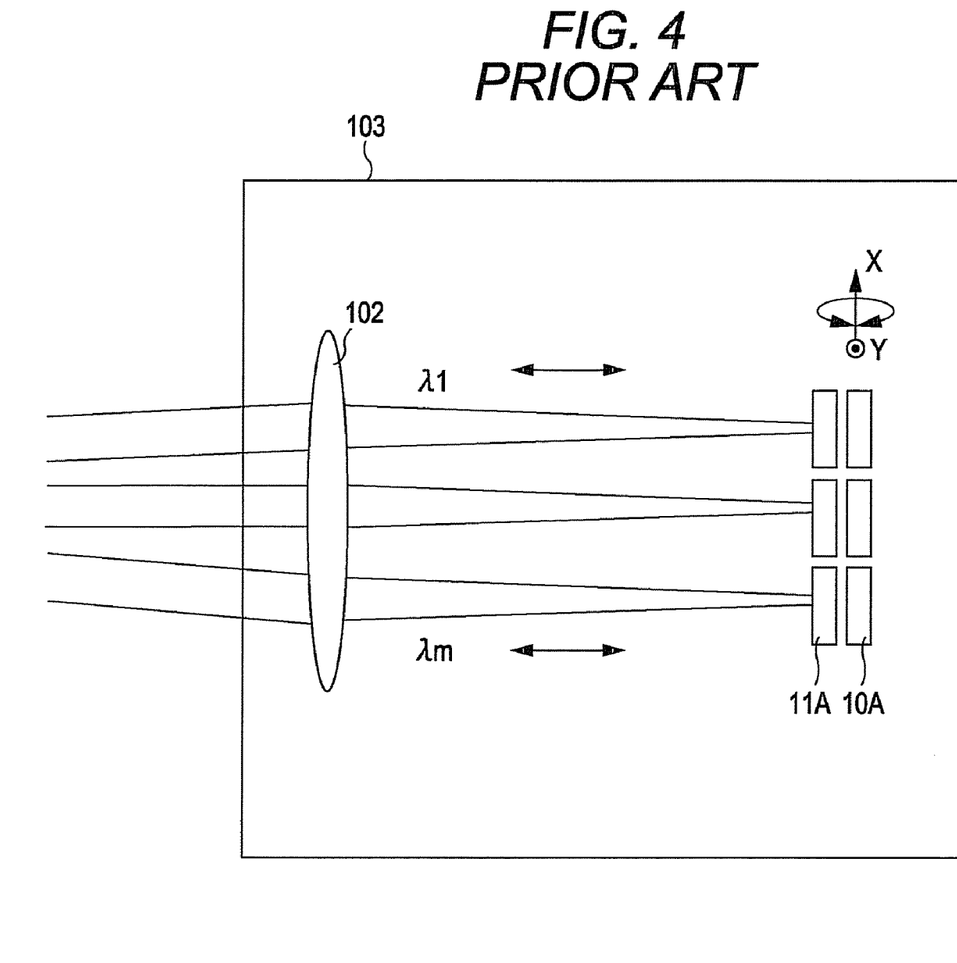
FIG. 4 is a diagram illustrating an optical signal processing unit according to a typical system.

Additionally, aside from a method for controlling attenuations by changing the angles of the MEMS mirrors 10, the optical signal processing unit 103 may be configured as an optical signal processing unit illustrated in FIG. 4. In FIG. 4, the optical signal processing unit has a MEMS array 10A, which selects a port in the third optical element, and a liquid crystal array 11A. The MEMS array 10A includes a plurality of MEMS mirrors 10. The liquid crystal array 11A includes a plurality of liquid crystal units and each of the plurality of liquid crystal units is provided for the respective MEMS mirrors 10 and gives attenuation. In this configuration, each MEMS mirror 10 is configured to be able to rotate only around the X-axis to select a port.

Figure 5:
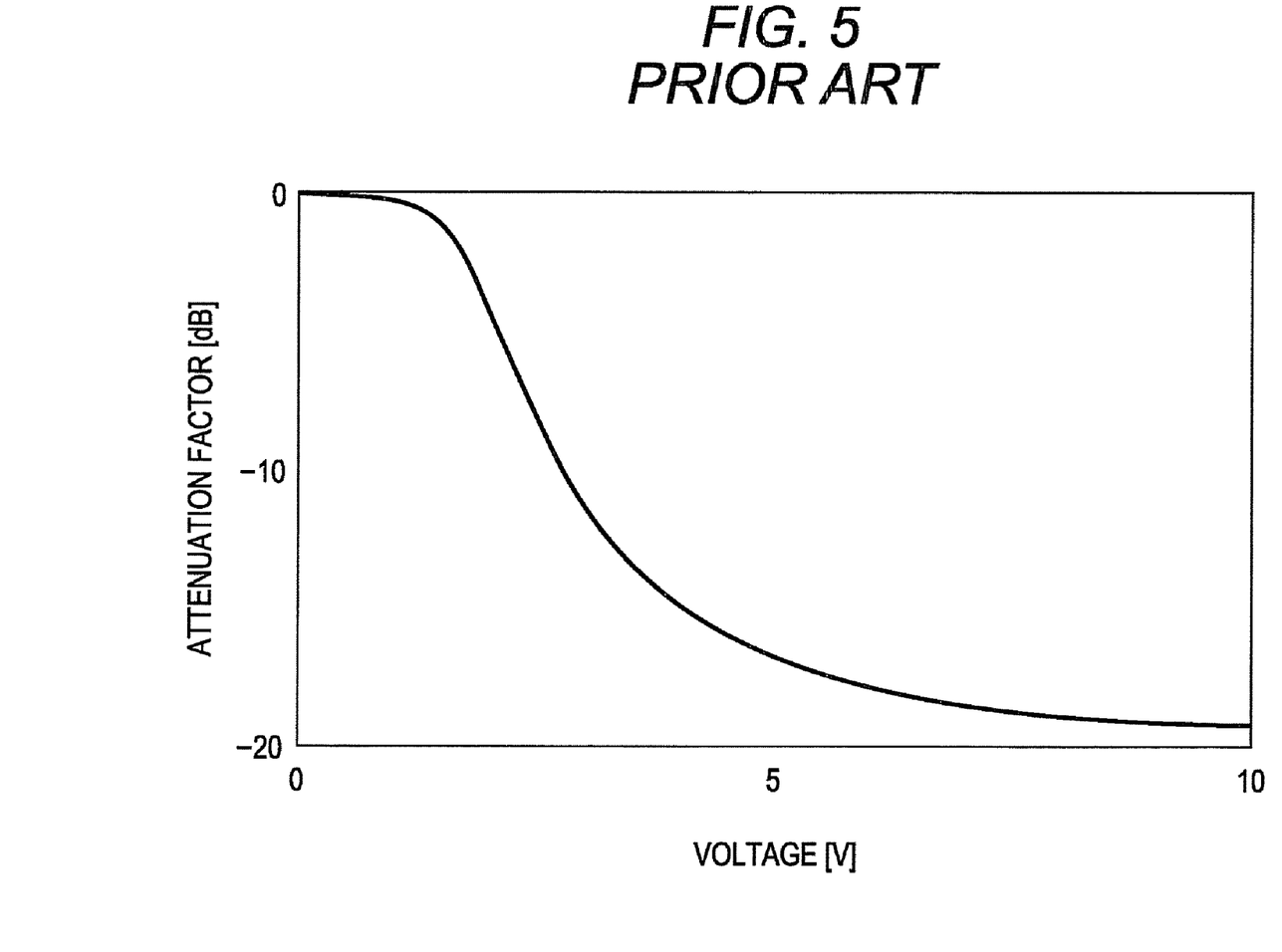
FIG. 5 is a diagram illustrating attenuation (vertical axis) relative to an applied voltage (horizontal axis) of a liquid crystal unit.

FIG. 5 is a diagram illustrating the attenuation (vertical axis) relative to the applied voltage (horizontal axis) of a liquid crystal unit. By controlling applied voltages to the liquid crystal units which are provided for the respective MEMS mirrors 10 of the MEMS array 10A, attenuations can be controlled.

Figure 6A:
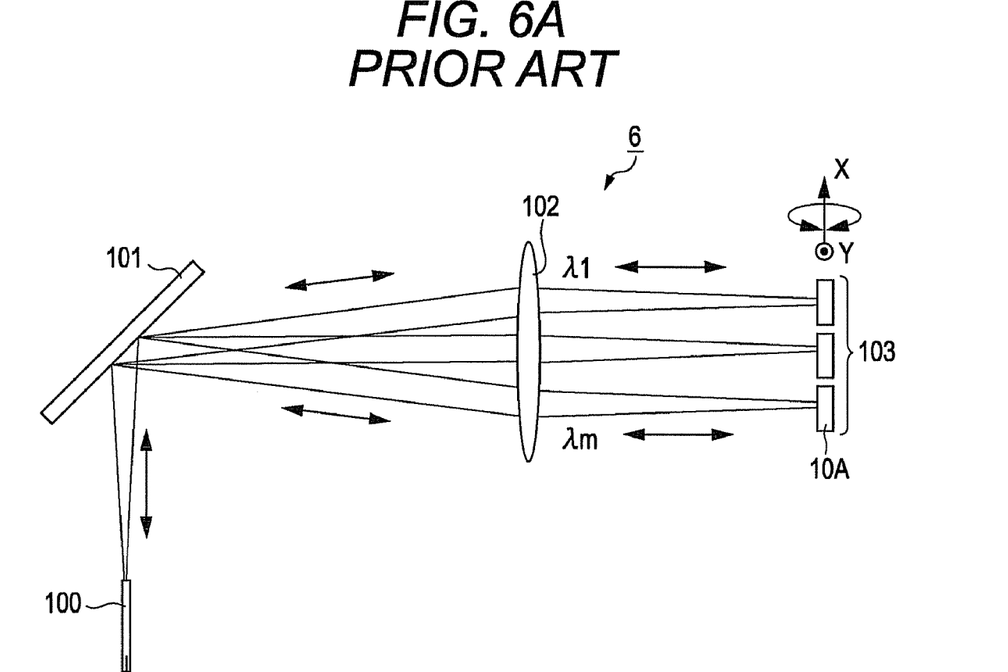
FIGS. 6A and 6B are diagrams illustrating an ADD-type wavelength selective optical switch having a configuration for monitoring an output on a wavelength-by-wavelength basis, according to a typical system.
Figure 6B:
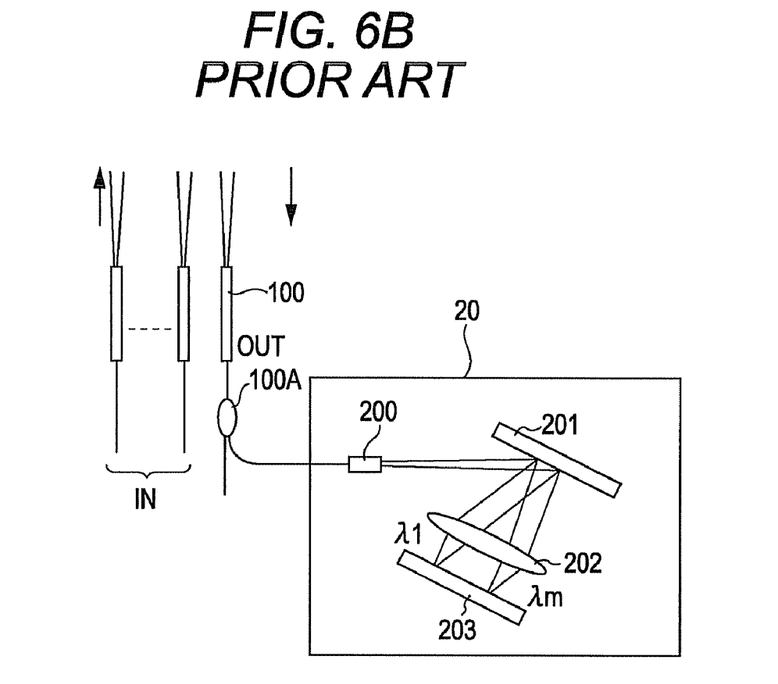

FIGS. 6A and 6B are diagrams illustrating a wavelength selective optical switch 6, where an output monitoring on a wavelength-by-wavelength basis is further added to an ADD-type wavelength selective optical switch.

The output monitoring is configured such that some of WDM signal lights at an output port OUT are divided by a coupler 100A and the divided lights are allowed to enter a wavelength monitoring unit 20.

As illustrated in FIGS. 6A and 6B, the wavelength monitoring unit 20 includes a third optical element 200, a wavelength dividing unit 201 including a diffraction grating, and a PD (photodetector unit) array 203. Elements of the PD array 203 respectively correspond to wavelengths of WDM signal lights and thus can detect light intensities for the respective wavelengths of the WDM signal lights.

Information detected by the PD array 203 is used, if necessary, for feedback control for the purpose of angle correction of a MEMS array 10A, etc.

A configuration that has an optical signal processor which performs a process on lights input to an input port, according to a wavelength thereof and outputs the processed lights from an output port, and a monitoring unit which extracts and receives some of the lights processed according to the wavelength thereof, when the lights are output from the output port, to monitor the received lights is described in, for example, Japanese Patent Application Laid-Open No. 2005-301123.

In the above-described configuration of a wavelength selective optical switch, attenuations are set according to change in angles of the MEMS mirrors 10 composing the MEMS array 10A.

The angle of a MEMS mirror 10 is normally changed by a voltage to be applied thereto and attenuation is given by the angle, as illustrated in FIG. 3. Hence, there is a need to install in an apparatus in advance voltages to be applied to the MEMS mirror 10 and attenuations in the form of a numerical value table and obtain, upon actual use, a voltage value required to have required attenuation from the table.

Here, a required angle of the MEMS mirror 10 is very small and attenuation relative to a voltage to be applied has low accuracy and furthermore varies with, for example, a temperature. Also, as described in FIG. 2, when the MEMS mirror 10 is driven to change its angle around the X-axis and the Y-axis by generating electrostatic attractive force by a voltage applied to an electrode which is disposed on the rear side of the MEMS mirror 10, there is a problem specific to the MEMS mirror 10 that charges are accumulated in a mirror portion and accordingly the voltage-angle characteristics gradually change.

In the case of an ADD-type wavelength selective optical switch, as illustrated in FIGS. 6A and 6B, in order to obtain required attenuation, the MEMS mirrors 10 are feedback-controlled in a manner such that some of lights at the output port OUT are divided by the coupler 100A and the signal intensities of respective wavelength components are monitored by an array-type detector unit including the PD array 203.

However, for example, upon activation of an apparatus or when optical signals are cut off for some kind of reason such as due to failure, e.g., cut-off fiber, there is no optical signal input to the wavelength selective optical switch and thus lights at the output port OUT cannot be monitored.

For example, a situation where no optical signals arrive at all for some kind of reason will be considered. In such a case, the switch has to set a fixed attenuation using a preset voltage/attenuation table and then wait.

In this state, for example, when the attenuation is actually greater than a required set value, even if optical signals recover, since the setting for attenuating more than necessary is performed earlier, there is a problem that the wavelength monitoring unit 20 in FIGS. 6A and 6B may determine that sufficient optical signal intensity has not arrived.

On the other hand, when the attenuation is actually smaller than a required set value, even if optical signals recover, since the signals are not sufficiently attenuated, signals with excess intensity are output from the output port OUT. Accordingly, there is a concern that influence such as physical destruction may be exerted on an optical transmission apparatus at a subsequent stage.

SUMMARY

An optical apparatus includes a plurality of input ports, each receiving wavelength division multiplexed (WDM) light that is input, an output port, a first wavelength dividing unit that divides the lights input from the plurality of input ports into divided lights with different wavelengths, an optical signal processing unit that reflects the divided lights respectively to the first wavelength dividing unit, thereby light from one of the plurality of input ports is directed to the output port, for respective wavelength of the divided lights, a light source outputting a monitor light; a first coupler branching the monitor light to plurality of monitor lights to the plurality of input ports, a second coupler branching the monitor lights output from the output port and outputs branched output monitor light, a second wavelength dividing unit that divides the branched monitoring lights into divided lights with different wavelengths, and a monitoring unit monitoring the divided lights from the second wavelength dividing unit.

The monitor light includes light components whose wavelength are an integer fraction of the wavelengths of multiplexed light in the WDM light input to the plurality of input ports, and an optical signal processing unit is controlled based on a monitor result of the monitoring unit.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Reference will now be made in detail to the embodiments, examples of which are illustrated in the accompanying drawings, wherein like reference numerals refer to the like elements throughout. The embodiments are described below to explain the present invention by referring to the figures.

Figure 7A:
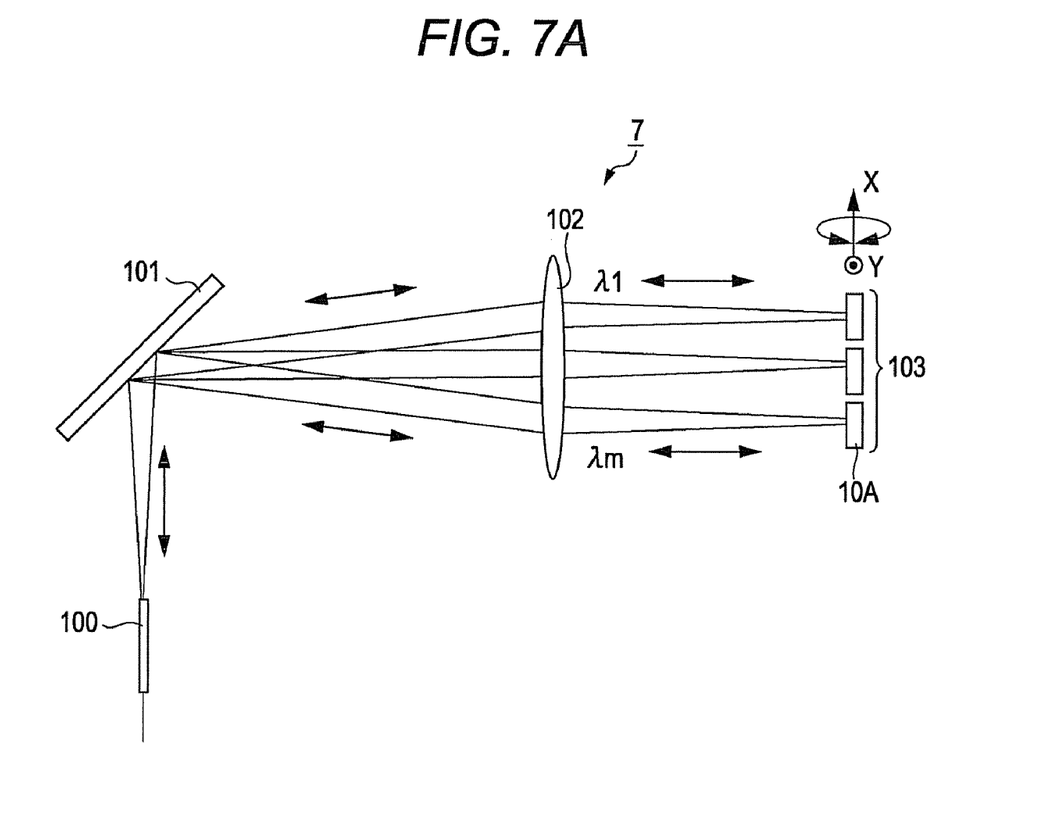
FIGS. 7A and 7B are diagrams illustrating a wavelength selective optical switch according to an embodiment.
Figure 7B:
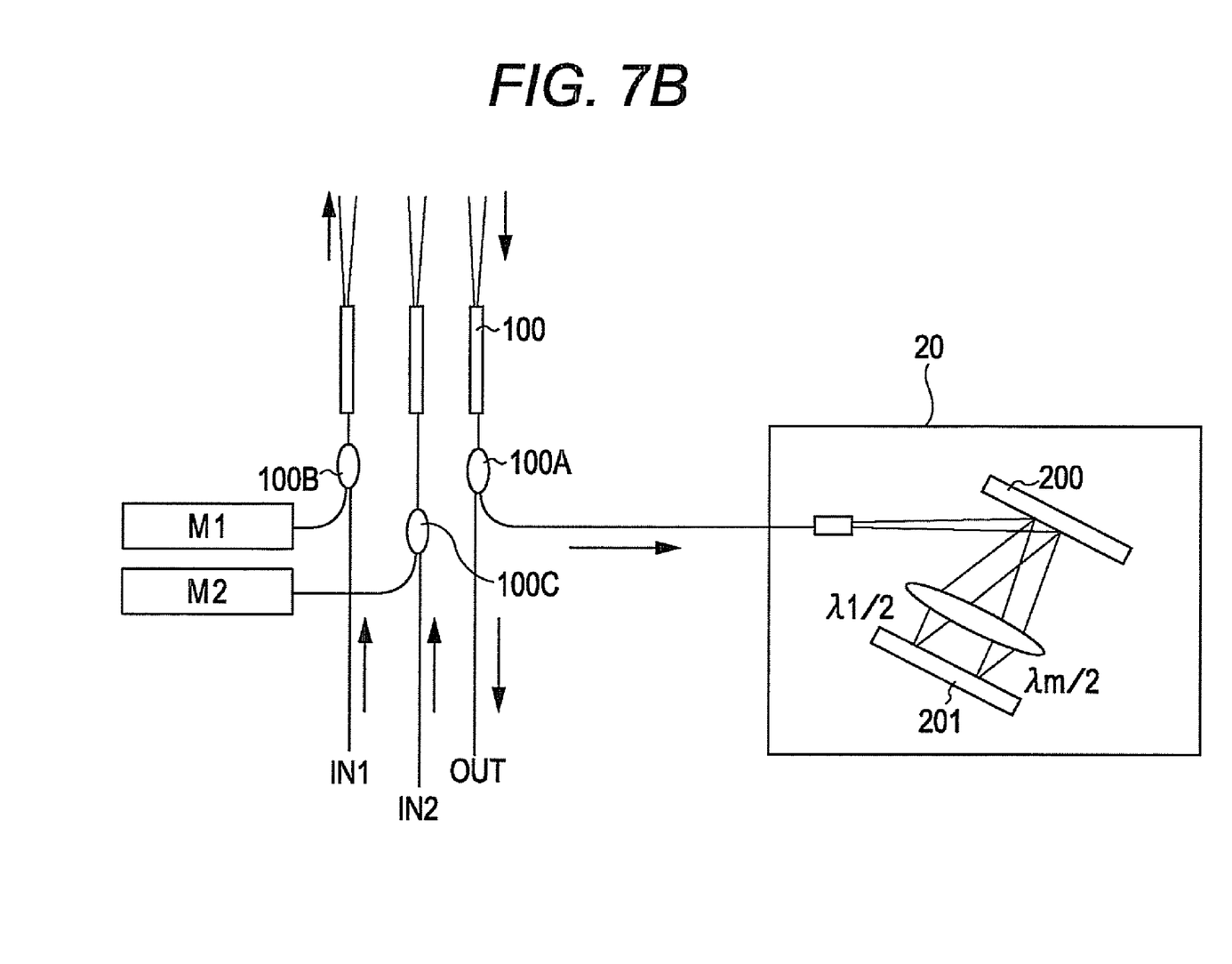

FIGS. 7A and 7B are respectively a top view and a side view illustrating a wavelength selective optical switch 7 according to an embodiment. The embodiment includes m-input-to-n-output wavelength selective optical switch, and FIGS. 7A and 7B illustrates two-input, one-output ADD-type wavelength selective optical switch. The wavelength selective optical switch 7 of FIG. 7A is further described in association with FIG. 7B.

The wavelength selective optical switch 7 illustrated in FIG. 7B has first and second input ports IN1 and IN2 to which WDM signal lights with wavelengths $\lambda 1$ to $\lambda m$ are input; and monitoring light sources M1 and M2 each having at least components with $\lambda/2$ to $\lambda m/2$ which are wavelength-multiplexed with the WDM signal lights with the wavelengths $\lambda 1$ to $\lambda m$.

The wavelength selective optical switch 7 has couplers 100B and 100C that input monitoring lights from the monitoring light sources M1 and M2.

For the couplers 100B and 100C, as with a coupler 100A for dividing monitoring lights at an output port OUT, fusion couplers (optical couplers) obtained by fusing and coupling two optical fibers, etc., are used.

Figure 8:
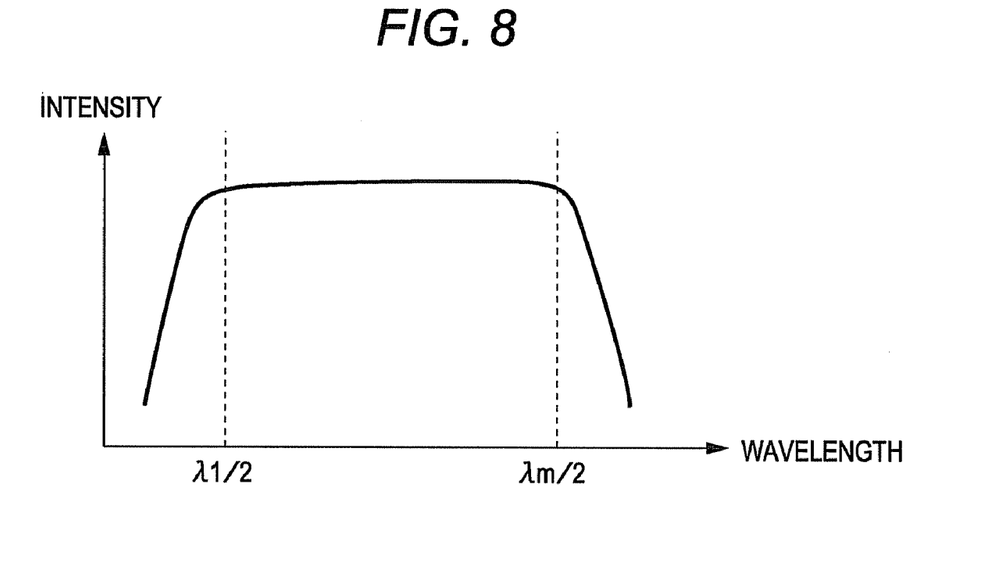
FIG. 8 is a diagram illustrating a wavelength spectrum of monitoring light sources M1 and M2 according to an embodiment.

FIG. 8 is a diagram illustrating a wavelength spectrum of the monitoring light sources M1 and M2. The monitoring light sources M1 and M2 are broadband white light sources. For example, when a 1.5 μm-band wavelength is used for $\lambda 1$ to $\lambda m$, the wavelength band of the monitoring light sources M1 and M2 is a 750 nm band.

By the couplers 100B and 100C on the input side, lights from the monitoring light source M1 are coupled and added to WDM signal lights entering from the input port IN1 and lights from the monitoring light source M2 are coupled and added to WDM signal lights entering from the input port IN2, with a small loss.

Then, the WDM signal lights having the monitoring lights added thereon are collimated by a first optical element 100 (FIG. 7B).

The collimated lights are divided into m lights with m different wavelengths by a wavelength dividing unit 101, which includes a diffraction grating. The divided lights are collected by a second optical element 102 (FIG. 7B) and the collected lights enter an optical signal processing unit 103. In the optical signal processing unit 103, the lights enter m respective MEMS mirrors 10 of a MEMS array 10A, which are provided for the respective wavelengths.

Then, in the optical signal processing unit 103, by changing the angles around the X-axis of the MEMS mirrors 10, for respective wavelengths, an input signal to one of the input ports IN1 and IN2 are selected to couple the output port OUT.

Additionally, couplings are performed with an arbitrary attenuation including by slightly rotating the MEMS mirrors 10 around the X-axis or the Y-axis.

Signal lights reflected from the optical signal processing unit 103 are collimated by the second optical element 102. The collimated signal lights with wavelengths $\lambda 1$ to $\lambda m$ which are reflected by the optical wavelength dividing unit 101 and return the same path as illustrated in the top view of FIG. 7A.

As described previously, by controlling the angles around the X-axis of the MEMS mirrors 10, one of the input ports IN1 and IN2 is coupled to the output port OUT for each wavelengths.

Lights entering the output port OUT are demultiplexed into WDM signal lights and monitoring lights by the coupler 100A. The coupler 100A separates the lights into, for example, 1.5 μm-band lights and 750 nm-band lights, with a small loss.

For example, as described previously, for the coupler 100A, a fusion coupler or the like may be used. The monitoring lights are introduced into a monitoring light detecting unit 20 and are collimated by a fourth optical element. Then, the collimated lights are divided into lights with different wavelengths by a wavelength dividing unit 200, which includes a diffraction grating. The divided lights are collected by a fifth optical element and the collected lights enter an array-type photodetector element 201 including, for example, PDs (photodiodes).

The PD array 201 has cells which are provided for the respective m wavelengths $\lambda 1/2$ to $\lambda m/2$ and thus can monitor power on a wavelength-by-wavelength basis.

Figure 9:
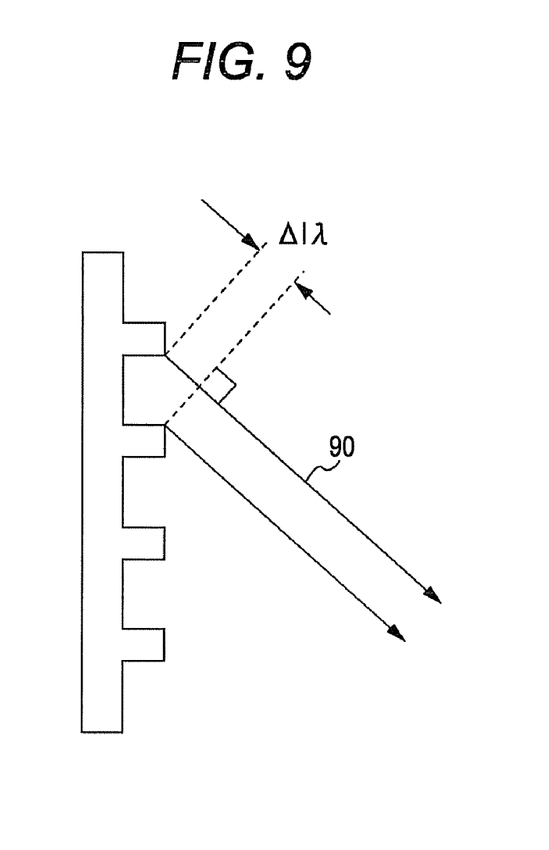
FIG. 9 is a diagram illustrating characteristic(s) of a diffraction grating.

FIG. 9 is a diagram illustrating characteristic(s) of a diffraction grating. As illustrated in FIG. 9, in the wavelength dividing units 101 (FIG. 7A) and 200 (FIG. 7B), a high intensity diffracted light is generated for a signal light with a wavelength $\lambda 1$, in a direction of an angle at which $\Delta l$ which is a component in a diffraction angle direction of the grating spacing of the diffraction grating becomes an integral multiple of $\lambda 1$. For the $\Delta l$, a wavelength $\lambda 1/2$ similarly becomes an integral multiple. Thus, in a signal light with $\lambda 1$ and a light with a wavelength $\lambda 1/2$, diffracted lights in the same direction intensify each other. Therefore, a signal light with a wavelength $\lambda 1$ and monitoring light component with a wavelength of $\lambda 1/2$ follow exactly the same path, because of the characteristics of the diffraction grating.

Since the signal light with a wavelength $\lambda 1$ and the monitoring light component with a wavelength of $\lambda 1/2$ follow exactly the same path, the same port selection and attenuation as those performed on the signal light $\lambda 1$ are performed on the monitoring light component with a wavelength of $\lambda 1/2$, by a MEMS mirror corresponding to the signal light $\lambda 1$. Similarly, for each of the signal lights with $\lambda 2$ to $\lambda m$, monitoring lights with $\lambda 2/2$ to $\lambda m/2$, respectively, follow the same path, the same port selection, and attenuation as those performed on their corresponding signal lights are performed on the monitoring lights.

An attenuation of a monitoring light can be obtained from a light intensity at which the monitoring light is coupled to the output port OUT with the least loss, which is recorded in advance, and a light intensity of the monitoring light according to the change in the angle of a corresponding MEMS mirror 10.

The attenuation of the monitoring light relative to the angle of the MEMS mirror 10 has characteristics illustrated in FIG. 3, for example, and the characteristics are same as the one with a WDM signal light. FIG. 3 illustrates the attenuation relative to F×θ where the focal length of the third optical element is F and the angle of the MEMS mirror 10 is θ.

Although the description above is about the two-input, one-output configuration, an embodiment can also be similarly applied to configurations with other numbers of input ports and output ports.

For example, monitoring lights are prepared for all input ports whose number is one or more and monitoring lights are added to lights by corresponding couplers. Also, monitoring lights are obtained from all output ports OUT whose number is one or more by dividing by corresponding couplers and the monitoring lights are guided to the monitoring light detecting unit 20.

Additionally, although the description above is utilizing monitoring lights having wavelength components of $\lambda 1/2$ to $\lambda m/2$ for the WDM signal lights with wavelengths of $\lambda 1$ to λm, the wavelengths of monitoring lights may be 1/N relative to corresponding WDM signal lights, where N is an integer of 2 or more. That is, since a light with a wavelength of λ1/N follows exactly the same path as a light with a wavelength of λ1 because of the characteristics of the diffraction grating, the light with a wavelength of λ1/N can be used as a monitoring light for the light with a wavelength of λ1, as well as the light with a wavelength of λ1/2.

Namely, light sources having components with λ1/N to λm/N may be used as monitoring lights.

The signal processing unit 103 may attenuate light including in the same manner as in typical use, i.e., by the angles of MEMS mirrors of an MEMS array or by liquid crystal elements using a combination of a MEMS array and the liquid crystal elements.

Although in the present embodiment reflection-type diffraction gratings are used as the wavelength dividing units 101 and 200, transmission-type diffraction gratings may be used.

Figure 10A:
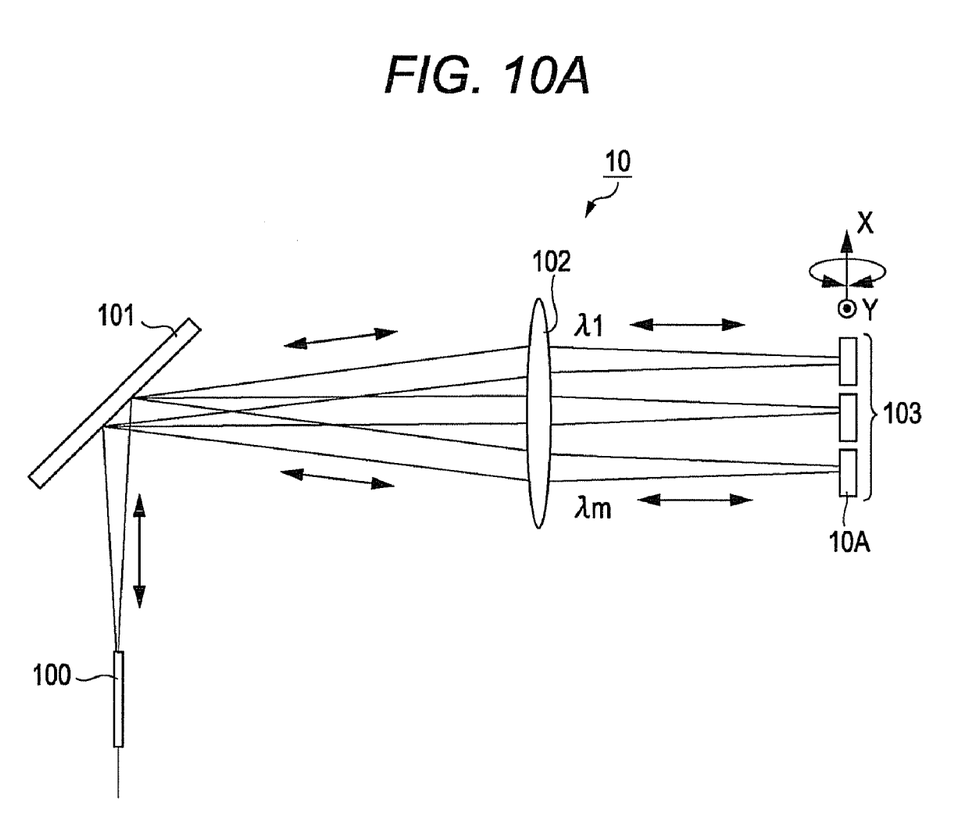
FIGS. 10A and 10B are diagrams illustrating a wavelength selective optical switch according to an embodiment.
Figure 10B:
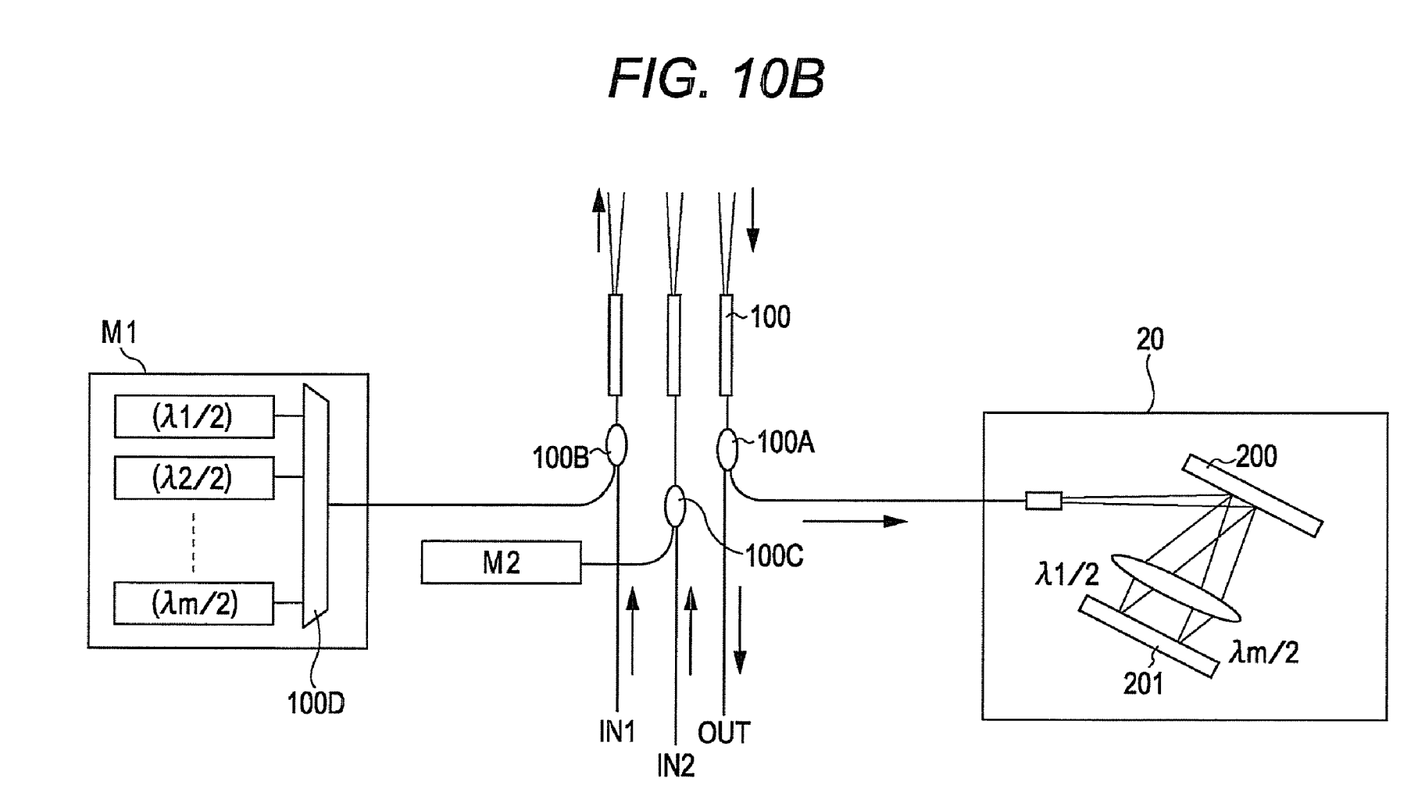

FIGS. 10A and 10B are diagrams illustrating a wavelength selective optical switch 10 according to an embodiment. The wavelength selective optical switch 10 is a configuration of a two-input, one-output ADD-type wavelength selective optical switch, similar to the wavelength selective optical switch 7 illustrated in FIGS. 7A and 7B.

Corresponding to wavelengths of λ1 to λm in the WDM signal lights, a monitoring light source M1 outputs a monitoring light that lights with wavelengths of λ1/2 to λm/2 are multiplexed by a coupler 100D. Though not illustrated, a monitoring light source M2 also has the same configuration with the monitoring light source M1 and the monitoring light source M2 outputs a monitoring light that lights with wavelengths of λ1/2 to λm/2 are multiplexed by the coupler 100D.

Figure 11:
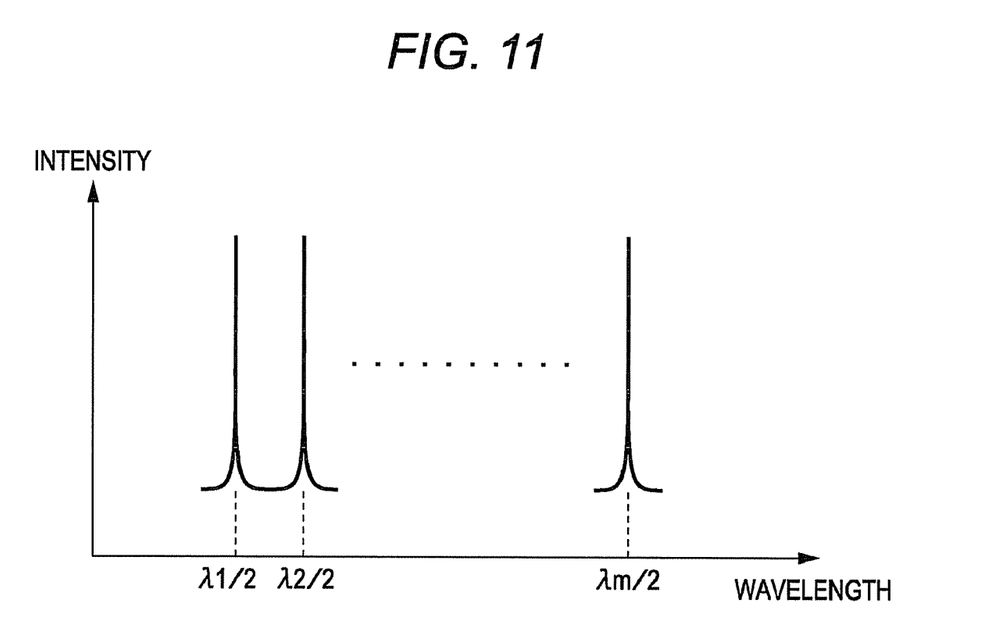
FIG. 11 is a diagram illustrating a spectrum of monitoring light sources according to an embodiment.

For the coupler 100D, a fusion coupler, a multilayer type, or the like can be used. FIG. 11 is a diagram illustrating a spectrum of output lights of the monitoring light sources M1 and M2.

By couplers 100B and 100C, lights from the monitoring light source M1 are added to WDM signal lights entering from an input port N1, and lights from the monitoring light source M2 are added to WDM signal lights entering from an input port N2.

For there is a same relationship between a signal light with a wavelength of λ1 and a monitoring light with a wavelength of λ1/2, the monitoring light with a wavelength of λ1 operates the same way as the embodiment illustrated above. Similarly, for there is a same relationship between signal lights with wavelengths of λ to λm and monitoring lights with wavelengths of λ1/2 to λm/2, the monitoring lights with wavelengths of λ1/2 to λm/2 operates the same way as the embodiment illustrated above. That is, by detecting an attenuation of a monitoring light, an attenuation of a corresponding WDM signal light can be detected.

Although the description above is about the two-input, one-output configuration, the embodiment can also be applied to configurations with other numbers of input ports and output ports.

Additionally, although monitoring lights are obtained by multiplexing single-wavelength lights with wavelengths of λ1/2 to λm/2, corresponding to WDM signal lights wavelengths of λ1 to λm, the wavelengths of monitoring lights may be 1/N relative to corresponding WDM signal lights, where N is an integer of 2 or more.

That is, since a light with a wavelength of λ1/N follows exactly the same path as a light with a wavelength of λ1 because of the characteristics of the diffraction grating, the light with a wavelength of λ1/N can be used as a monitoring light for the light with a wavelength of λ1, as well as a light with a wavelength λ1/2. Namely, a light source that multiplexes single-wavelength lights with λ1/N to λm/N may be used as a monitoring light.

A signal processing unit 103 may attenuate light in the same manner as in the conventional cases, i.e., by the angles of MEMS mirrors or by liquid crystal elements using a combination of a MEMS array and the liquid crystal elements.

Although description is made using reflection-type diffraction gratings as wavelength dividing units 101 and 200, transmission-type diffraction gratings may be used.

In the embodiments described above, monitoring lights λ1/N to λm/N with wavelengths 1/N (N is an integer of 2 or more) are respectively added to Wavelength Division Multiplexing (WDM) signal lights (wavelengths λ1 to λm).

For example, for a signal light with a wavelength λ1, a monitoring light with a wavelength λ1/N follows exactly the same path as λ1 because of the characteristics of the wavelength dividing units, which includes diffraction gratings, and the same port selection and attenuation as those performed on the signal light with λ1 are performed on the monitoring light by a MEMS mirror corresponding to λ1.

Similarly, for signal lights with λ2 to λm, too, monitoring lights with λ2/N to λm/N follow the same path as their corresponding signal lights and the same port selection and attenuation as those performed on their corresponding signal lights are performed on the monitoring lights.

Detection of attenuations by these monitoring lights can be monitored at all times (and at each side of processing) without exerting any influence at all on WDM signal lights. Thus, for example, even upon activation of an apparatus or even when WDM signal lights are cut off for some kind of reason, attenuations for WDM signal lights can be monitored at all times.

Those configurations can solve a problem that when optical signals are cut off for some kind of reason such as failure, e.g., cut-off, there is no optical signal input to the wavelength selective optical switch and thus lights at the output port OUT cannot be monitored.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention, the scope of which is defined in the claims and their equivalents.

What is claimed is:

1. An optical apparatus, comprising:
   a plurality of input ports, each of which receive a wavelength division multiplexed (WDM) light as an input;
   an output port;
   a first wavelength dividing unit that divides lights from the plurality of input ports into divided lights with different wavelengths;
   an optical signal processing unit that reflects the divided lights respectively to the first wavelength dividing unit, and directs light from one of the plurality of input ports to the output port for a respective wavelength of the divided lights;
   a light source that outputs monitor lights that have wavelengths equal to the different wavelengths/N, where N is 2 or more integers;
   a first coupler that branches a monitor light into a plurality of monitor lights and outputs the plurality of monitor lights to the plurality of input ports;
   a second coupler that branches the monitor lights from the output port and outputs the branched output monitor light;
   a second wavelength dividing unit that divides the branched monitoring lights into divided lights with different wavelengths; and
   a monitoring unit that monitors the divided lights from the second wavelength dividing unit, and where the optical signal processing unit is monitored based on a monitor result.

2. The optical apparatus according to claim 1, wherein the optical signal processing unit includes an array of mirrors and angles of the mirrors are controlled based on the monitor result of the monitoring unit.

3. The optical apparatus according to claim 1, wherein the optical signal processing unit includes an array of mirrors and liquid crystal elements, and angles of the mirrors and attenuation of the liquid crystal elements are controlled based on the monitor result of the monitoring unit.

4. The optical apparatus according to claim 3, wherein a path of light with each wavelength is changed by an angle of a corresponding mirror in the array of mirrors, and an attenuation of light with each wavelength is changed by a corresponding liquid crystal element in the liquid crystal elements.

5. The optical apparatus according to claim 1, wherein the optical apparatus is a selective optical switch.

6. The optical apparatus according to claim 2, wherein the optical signal processing unit changes the angles around the mirrors for the respective wavelengths.

7. A method performed by an optical apparatus, comprising:
   dividing lights received from a plurality of input ports into divided lights with different wavelengths;
   reflecting the divided lights, and directing light from one of the plurality of input ports to an output port for a respective wavelength of the divided lights;
   outputting monitor lights that have wavelengths equal to the different wavelengths;
   branching each of the monitor lights into a plurality of monitor lights, outputting the plurality of monitor lights to the plurality of input ports, and outputting a branched output monitor light;
   dividing the branched monitoring lights into divided lights with different wavelengths; and
   monitoring the divided lights by a monitoring result.

8. The method according to claim 7, wherein the optical apparatus is a selective optical switch.

9. The method according to claim 7, wherein the reflecting comprises changing angles around mirrors for the respective wavelengths.

10. The method according to claim 7, wherein the monitoring comprises detecting an attenuation of each of the divided lights.

11. A non-transitory computer readable medium executing a process performed by an optical apparatus, comprising:
    dividing lights received from a plurality of input ports into divided lights with different wavelengths;
    reflecting the divided lights, and directing light from one of the plurality of input ports to an output port for a respective wavelength of the divided lights;
    outputting monitor lights that have wavelengths equal to the different wavelengths;
    branching, each of the monitor lights into a plurality of monitor lights, outputting the plurality of monitor lights to the plurality of input ports, and outputting a branched output monitor light;
    dividing the branched monitoring lights into divided lights with different wavelengths; and
    monitoring the divided lights by a monitoring result.

12. The non-transitory computer readable medium according to claim 11, wherein the optical apparatus is a selective optical switch.

13. The non-transitory computer readable medium according to claim 11, wherein the reflecting comprises changing angles around mirrors for the respective wavelengths.

14. The non-transitory computer readable medium according to claim 11, wherein the monitoring comprises detecting an attenuation of each of the divided lights.

* * * * *